United States Patent
Smith

[11] 3,914,194
[45] Oct. 21, 1975

[54] UNSATURATED FORMALDEHYDE COPOLYMER RESINS DERIVED FROM DIARYL OXIDES, SULFIDES, DIBENZOFURAN OR DIBENZOTHIOPHENE

[75] Inventor: Harry A. Smith, Midland, Mich.

[73] Assignee: The Dow Chemical Company, Midland, Mich.

[22] Filed: Apr. 2, 1973

[21] Appl. No.: 347,173

[52] U.S. Cl. ........ 260/18 R; 260/19 R; 260/19 UA; 260/19 N; 260/23 R; 260/23 AR; 260/23 S; 260/23 XA; 260/67 A; 260/67 S; 260/67 UA; 260/52
[51] Int. Cl.² ............... C08L 91/00; C08G 8/08; C08G 16/02; C08G 16/04
[58] Field of Search ........ 260/67 S, 67 A, 52, 18 R, 260/19 R, 19 UA, 23 R, 19 N, 23 AR, 23 S

[56] References Cited
UNITED STATES PATENTS

| | | | |
|---|---|---|---|
| 2,124,285 | 7/1938 | Bucherer | 260/19 UA |
| 2,395,739 | 2/1946 | Hersberger | 260/53 |
| 2,622,071 | 12/1952 | Harrison | 260/19 N |
| 2,985,615 | 5/1961 | Tunteler | 260/52 X |
| 3,579,470 | 5/1971 | Runk | 260/19 UX |
| 3,630,977 | 12/1971 | Broecker et al. | 260/19 |
| 3,655,378 | 4/1972 | Contois et al. | 260/67 S |

*Primary Examiner*—Howard E. Schain
*Attorney, Agent, or Firm*—Benjamin G. Colley

[57] ABSTRACT

A formaldehyde copolymer resin having dependent unsaturated groups with the repeating unit:

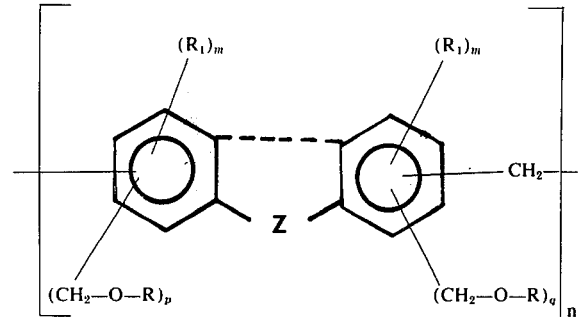

wherein R is an aliphatic acyl group derived from saturated acids having 2–6 carbons, olefinically unsaturated acids having 3–20 carbons, or an omega-carboxy-aliphatic acyl group derived from olefinically unsaturated dicarboxylic acids having 4–12 carbons or mixtures thereof, $R_1$ is independently hydrogen, an alkyl group of 1–10 carbon atoms, or halogen, Z is selected from oxygen, sulfur, the group represented by Z taken with the dotted line represents dibenzofuran and dibenzothiophene moieties, or mixtures thereof, $n$ is a whole number sufficient to give a weight average molecular weight greater than about 500, $m$ is 0–2, $p$ and $q$ have an average value of 0 to 1 with the proviso that the total number of $p$ and $q$ groups are sufficient to give greater than one unsaturated group per resin molecule.

These resins are useful to prepare coatings on various substrates or for potting electrical components by mixing with reactive diluents and curing agents and curing.

8 Claims, No Drawings

UNSATURATED FORMALDEHYDE COPOLYMER RESINS DERIVED FROM DIARYL OXIDES, SULFIDES, DIBENZOFURAN OR DIBENZOTHIOPHENE

BACKGROUND OF THE INVENTION

This invention relates to formaldehyde copolymer resins having dependent unsaturation, a process for their preparation, and to curable and cured compositions prepared therefrom. More specifically, the invention relates to copolymers of formaldehyde with various diaryl compounds such as diphenyl oxide having dependent unsaturation derived from the concurrent reaction of the above monomers with olefinically unsaturated mono- or dicarboxylic acids.

It is known from Imoto et al. Makromolekulare Chemie 97:163 (1966), British Pat. No. 942,057; and Ser. No. 236,472, filed Mar. 20, 1972, that resins can be prepared from formaldehyde and diphenyl oxide. However, these resins do not have dependent unsaturation groups which can be cured in admixture with reactive diluents such as styrene.

It is also known from U.S. Pat. No. 2,985,615 that unsaturated polyesters can be prepared by reacting hydrocarbons such as xylene, diphenyl, or diphenyloxide with aldehydes and unsaturated carboxylic acids. However, these polyesters contain unsaturation in the resin backbone and are undesirable since they take many hours to prepare or "cook."

SUMMARY OF THE INVENTION

The present invention is a formaldehyde copolymer resin having the following repeating unit:

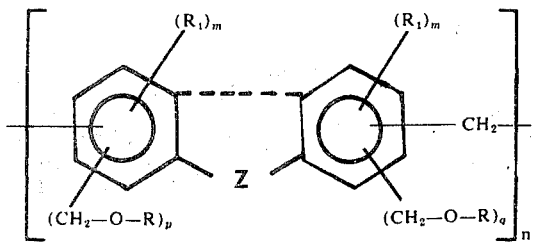

wherein R is an aliphatic acyl group derived from saturated acids having 2–6 carbons, olefinically unsaturated acids having 3–20 carbons, or an omega-carboxyaliphatic acyl group derived from olefinically unsaturated dicarboxylic acids having 4–12 carbons or mixtures thereof, $R_1$ is independently hydrogen, an alkyl group of 1–10 carbon atoms, or halogen, Z is selected from oxygen, sulfur, the group represented by Z taken with the dotted line represents dibenzofuran and dibenzothiophene moieties, or mixtures thereof, $n$ is a whole number sufficient to give a weight average molecular weight greater than about 500, $m$ is 0–2, $p$ and $q$ have an average value of 0 to 1 with the proviso that the total number of $p$ and $q$ groups are sufficient to give greater than one unsaturated group per resin molecule (i.e., the product of $n$ $(p+q)$ is greater than an average value of 1.0 and preferably greater than 1.5).

The process of making the resins and composition made therefrom are also part of this invention.

As indicated above, the formaldehyde copolymer resins of this invention can be either mono-substituted with olefinically unsaturated monocarboxylic acid esters or disubstituted with both a saturated acid ester and an olefinically unsaturated mono- or dicarboxylic acid ester.

It is to be understood that the resins are complex mixtures wherein the location of the various substituents are not known but their location is not essential to this invention. Likewise, the end groups have not been determined but they are believed to be hydrogen or methylene ester groups ($CH_2OR$) as defined above.

In general, these copolymers are prepared by reacting a mole of a diaryl type compound such as diphenyl oxide, diphenyl sulfide, dibenzofuran and the like with about 1.1 to about 10 moles of formaldehyde and about 1.0 to about 10 moles per mole of the diaryl compound of an olefinically unsaturated monocarboxylic acid having more than 3 carbons, about 0.1 to about 5 moles per mole of diaryl compound of an olefinically unsaturated dicarboxylic acid or mixtures thereof.

The reaction takes place in 0.05–4 hours in the presence of a catalytic amount of a strong inorganic or organic acid at a temperature range from about 90° to about 150°C.

The resins thus prepared are recovered from the reaction media by precipitation with water, filtering and washing.

The resins are useful in that they can be mixed with reactive diluents such as vinyl aromatic monomers, alkyl esters of olefinically unsaturated carboxylic acids, vinyl esters of carboxylic acids, mixtures thereof and the like.

Examples of these are styrene, chlorostyrene, t-butyl styrene, methyl acrylate, ethyl acrylate, methyl methacrylate, ethyl methacrylate, vinyl acetate, vinyl n-butyrate, vinyl benzoate and the like.

These curable mixtures are then mixed with conventional curing agents such as benzoyl peroxide, t-butyl peroxypivalate, methyl ethyl ketone peroxide, and the like and cured to prepare coatings on various substrates, used to pot or encapsulate electrical components, or used as a binder for reinforced plastics.

DETAILED DESCRIPTION

Suitable examples of the diaryl type compounds which can be reacted with formaldehyde and olefinically unsaturated carboxylic acids to prepare the copolymers of the invention are diphenyl oxide (phenyl ether), diphenyl sulfide, dibenzofuran, dibenzothiophene and mixtures thereof. Resins are also prepared from the alkylated derivatives of the foregoing wherein one or both aromatic rings are substituted by alkyl groups of 1–10 carbons.

If desired, the diaryl type compounds set forth above can be halogenated in one or both aromatic rings with fluorine, chlorine, bromine, or iodine groups. It is preferred to use the chloro or bromo derivatives. diphenyl oxide and diphenyl sulfide are preferred for economic reasons.

The aldehyde which can be used is formaldehyde in all its various forms such as formaldehyde solutions in $H_2O$, aqueous methanol, or paraformaldehyde.

The above reactants are reacted in the presence of an olefinically unsaturated monocarboxylic acid having 3–10 carbons, an olefinically unsaturated dicarboxylic acid or anhydride thereof having 4–12 carbons, or a mixture thereof.

Suitable unsaturated monocarboxylic acids are acrylic, crotonic, angelic, methacrylic, ethacrylic, oleic and linoleic acids.

Suitable unsaturated dicarboxylic acids are maleic, fumaric, itaconic, 3-hexene-1,6-dicarboxylic acid, citaconic, phenyl maleic, and the like.

Generally, three or more moles of such acids are used per mole of diaryl ether compound to provide a reaction medium. It is preferred to use a molar ratio in the range from about 4.0:1 to 5.5:1.

Excess lower alkanoic acids such as formic, acetic, propionic, butyric, pentanoic, hexanoic acid or mixtures thereof can be used with olefinically unsaturated dicarboxylic acids to provide a suitable reaction medium.

It is essential to carry out the reaction also in the presence of an organic or inorganic acid catalyst having a pKa of less than 0.5 in $H_2O$. Useful organic acid catalysts are sulfuric, perchloric, hydrochloric, and the like. They are generally used in a catalytic amount, i.e., in the range 0.001:1 to 0.5:1 of catalyst per mole of diaryl type compound.

The invention is further illustrated by the following examples which are not to be construed as limitations on the scope of the claims.

EXAMPLE 1-5

A mixture of 85 grams (0.5 mole) diphenyl oxide (DPO), 47.4 grams (1.5 moles) of 95% paraformaldehyde, 24.5 grams (0.25 mole) maleic anhydride, and 9.5 grams (0.05 mole) of p-toluene sulfonic acid monohydrate were mixed with 125 ml. (2.2 moles) of glacial acetic acid in a 1000 cc. glass reactor with stirrer. The mixture was heated to reflux, i.e., 105°–110°C. and held to this temperature range for 50 minutes. After cooling to about 100°C., 500 cc. of water was added and a white precipitate formed which was filtered off and dried. The yield was 137.2 grams of a white resin having a softening point in the range of 100°–155°C.

Nuclear magnetic resonance studies of the resin indicated the presence of the following repeating unit:

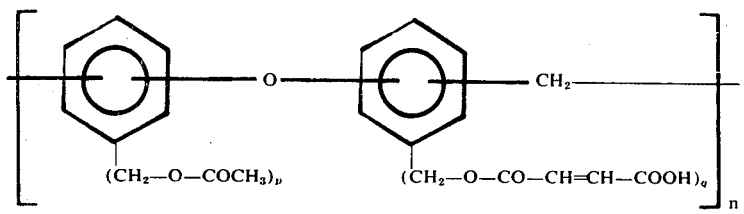

wherein the average values of $n$, $p$ and $q$ were 10, 0.45 and 0.4 respectively.

The procedure of Example 1 was repeated with variations in the molar amounts of acetic acid. The results are shown in Table I, along with the results of Example 1.

TABLE I

| Ex. | Moles Acetic Acid per Mole DPO | Reaction Time in Minutes | n | p | q | Mol. Wt. (Wt. Avg.) |
|---|---|---|---|---|---|---|
| 1 | 4.4 | 50 | 10 | 0.45 | 0.4 | 2100 |
| 2 | 5.2 | 10 | 6.5 | 0.35 | 0.2 | 1500 |
| 3 | 5.2 | 20 | 7.5 | 0.25 | 0.2 | 1660 |
| 4 | 4.4 | 10 | 6 | 0.4 | 0.1 | 1290 |
| 5 | 4.4 | 20 | 7 | 0.4 | 0.2 | 1450 |
| Control 1 | 2.6 | 12 | gelled | | | |
| Control 2 | (no acetic acid) | 0 | gelled | | | |

The foregoing table shows that it is essential that the diaryl compound, i.e., DPO, be reacted with the other monomers in the presence of at least about 3 moles of acetic acid per mole of DPO in order to obtain the proper degree of functionality, i.e., $n(p+q)$ and to avoid premature gelation. Similar results are obtained with the higher alkanoic acids such as propionic, butyric, etc.

EXAMPLES 6–9

The procedure of Example 1 was repeated with variations in the time the mixture was heated at the reflux temperature. The results are set forth in Table II along with the results of Example 1 for comparison purposes.

TABLE II

| Example | Reflux Time in Minutes | n | p | q | Mol. Wt. (Wt. Avg.) |
|---|---|---|---|---|---|
| Control | 60 | gelled | | | |
| 1 | 50 | 10 | 0.45 | 0.4 | 2100 |
| 6 | 30 | 8 | 0.35 | 0.2 | 1800 |
| 7 | 20 | 7 | 0.4 | 0.2 | 1450 |
| 8 | 10 | 6 | 0.4 | 0.1 | 1290 |
| 9 | 0 | 5.8 | 0.3 | 0.1 | 1220 |

EXAMPLES 10–13

The procedure of Example 1 was repeated with the same catalyst with variations in the amounts of reflux time and maleic anhydride used. The results are shown in Table III.

TABLE III

| Example | Moles F* per Mole DPO | Moles MA** per Mole DPO | Reflux Time in Minutes | n | p | q | Mol. Wt. (Wt. Avg.) |
|---|---|---|---|---|---|---|---|
| 10 | 3:1 | 0.5:1 | 10 | 6 | 0.4 | 0.1 | 1290 |
| 11 | 3:1 | 0.5:1 | 20 | 7 | 0.4 | 0.2 | 1450 |
| 12 | 3:1 | 1:1 | 10 | 6.5 | 0.35 | 0.2 | 1500 |
| 13 | 3:1 | 1:1 | 20 | 7.5 | 0.25 | 0.2 | 1660 |

*F = Paraformaldehyde
**MA = Maleic Anhydride

EXAMPLES 14–17

The procedure of Example 1 was repeated with variations in the amounts of paraformaldehyde and maleic anhydride and also changing the catalyst to sulfuric acid. The results are set forth in Table IV.

TABLE IV

| Example | Moles F per Mole DPO | Moles MA per Mole DPO | Reflux Time in Minutes | n | p | q | Mol. Wt. (Wt. Avg.) |
|---|---|---|---|---|---|---|---|
| 14 | 2:1 | 0.5:1 | 15 | 7.5 | 0.3 | 0.25 | 1760 |
| 15 | 2:1 | 0.5:1 | 30 | 8.0 | 0.2 | 0.3 | 1870 |
| 16 | 2:1 | 1:1 | 10 | 8.5 | 0.4 | 0.35 | 2200 |
| Control | 2:1 | 1:1 | 15 | gelled | | | |
| 17 | 1.5:1 | 1:1 | 45 | 8 | 0.3 | 0.1 | 1720 |

EXAMPLES 18–23

The procedures of Example 1 were repeated using 85 grams (0.5 mole) of diphenyl oxide, 47.4 grams (1.5 moles) of 95% paraformaldehyde, 9.5 grams (0.05 mole) of p-toluene sulfonic acid monohydrate, and varying amounts of acrylic acid to which was added 0.8 gram (0.5% by weight of the acrylic acid) of hydroquinone monomethyl ether (MEHQ). The mixture was stirred and heated to reflux (105°–110°C.) and held at this temperature for varying periods of time. At 20 minute intervals additional increments of 0.8 gram of MEHQ were added. The resulting resins were analyzed by N.M.R. and had the following repeating unit:

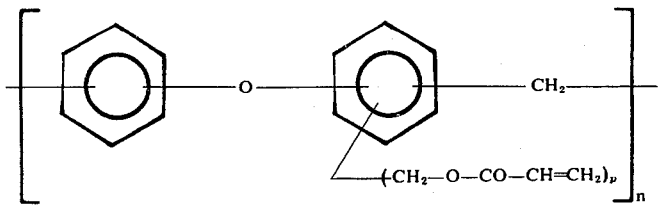

The results are tabulated in Table V.

TABLE V

| Ex. | Molar Ratio AA/DPO* | Reflux Time in Minutes | n | p | Mol. Wt. (Wt. Avg.) |
|---|---|---|---|---|---|
| 18 | 4.4:1 | 0 | 2 | 0.25 | 530 |
| 19 | 4.4:1 | 10 | 3 | 0.4 | 580 |
| 20 | 4.4:1 | 20 | 4 | 0.45 | 860 |
| 21 | 4.4:1 | 30 | 5 | 0.45–0.70 | 1150–1390 |
| 22 | 4.4:1 | 40 | 6 | 0.40–0.45 | 1340–1770 |
| Control | 4.4:1 | 50 | gelled | | |
| 23 | 2.2:1 | 30 | 12.7 | 0.55 | 2950 |

*AA = Acrylic Acid, DPO = Diphenyl Oxide

EXAMPLE 24

A sample of the resin prepared in Example 21 (60 grams) was placed in 40 grams of n-butyl acrylate to make a 40% by weight solution and this was coated on a 24 gauge sample of Bonderite 37 treated cold rolled steel which was 19 in. long by 4 in. wide. A Bonderite treatment is the trade name of the Parker Rust Proof Division of the Hooker Chemical Corporation for their phosphate surface treatment for ferrous metals.

This coated steel sample was then cured with an 8 megarad dose of 1 M.E.V. electrons in a nitrogen atmosphere. The resultant 1 mil. coating had good mar resistance, good solvent resistance, good adhesion and excellent impact resistance.

EXAMPLE 25

A sample of the resin prepared in Example 21 (100 grams) was dissolved in 100 grams of styrene to give a 50% weight percent mixture. This mixture was then stirred with 1.6% by weight of benzoyl peroxide poured into a mold and cured for 5 minutes at 100°C. in an oven. The result was a tough hard solid and was indicative of the fact that the instant resins are useful as potting resins when mixed with vinyl aromatic monomers.

EXAMPLES 26–30

Samples of the resin prepared in Example 1 were mixed with styrene to give solutions of varying percentages of styrene. These were then cured with varying amounts of benzoyl peroxide and the time was recorded for a stroke cure and for the gel time. The stroke cure time is a standard test using a hot plate and a wooden spatula. The results are given in Table VI.

TABLE VI

| Example | Wt. % Styrene | Wt. % BZ* | Stroke Cure Time in Sec. | | | Gel Time in Sec.** | | |
|---|---|---|---|---|---|---|---|---|
| | | | 100°C. | 125°C. | 150°C. | 100°C. | 125°C. | 150°C. |
| 26 | 20 | 0.5 | 690 | 285 | 285 | 150 | 90 | 90 |
| 27 | 40 | 0.2 | 900 | 180 | 220 | 410 | 90 | 70 |
| 28 | 40 | 0.5 | 585 | 180 | 120 | 240 | 95 | 50 |
| 29 | 40 | 1.0 | 780 | 150 | 105 | 360 | 80 | 45 |
| 30 | 60 | 0.5 | 540 | 330 | 300 | 285 | 140 | 45 |

*BZ = Benzoyl Peroxide
**ASTM D-2471-68

The foregoing table shows that gel and cure rate control can be obtained via variation of peroxide level, monomer (styrene) level, or cure temperature.

EXAMPLES 31–35

Examples 26–30 were repeated using chlorostyrene in place of styrene. The results are indicated in Table VII.

TABLE VII

| Example | Wt. % Chlorostyrene | Wt. % BZ | Stroke Cure Time in Sec. | | | Gel Time in Sec. | | |
|---|---|---|---|---|---|---|---|---|
| | | | 100°C. | 125°C. | 150°C. | 100°C. | 125°C. | 150°C. |
| 31 | 20 | 0.5 | 630 | 225 | 85 | 210 | 105 | 50 |
| 32 | 40 | 0.2 | 2040 | 330 | 140 | 900 | 150 | 105 |
| 33 | 40 | 0.5 | 1020 | 165 | 75 | 450 | 75 | 50 |
| 34 | 40 | 1.0 | 750 | 150 | 60 | 390 | 75 | 40 |
| 35 | 60 | 0.5 | 630 | 165 | 60 | 420 | 105 | 40 |

This table indicates that the same factors control gel and cure rates with both being slower with chlorostyrene than styrene (Table VI).

EXAMPLES 36–41

Example 18 was repeated replacing the acrylic acid with 186 ml. (2.2 moles) of methacrylic acid and using 0.5 gram (0.26% by weight of the methacrylic acid) of monomethyl ether of hydroquinone (M.E.H.Q.). No additional MEHQ was needed during the reaction. The resulting resins were analyzed by NMR and had the following repeating unit:

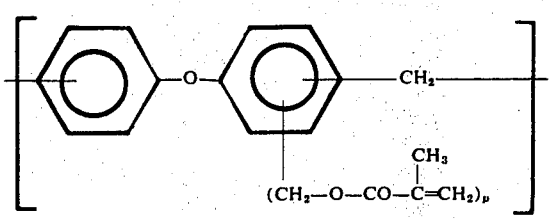

The results are tabulated in Table VIII.

TABLE VIII

| Ex. | Reflux Time in Minutes | n | p | Mol. Wt. (Wt. Avg.) |
|---|---|---|---|---|
| 36 | 0 | 1 | 0.10 | 180 |
| 37 | 15 | 1.5 | 0.30 | 300 |
| 38 | 30 | 2 | 0.40 | 430 |
| 39 | 60 | 6 | 0.45 | 1340 |
| 40 | 90 | 7–9.5 | 0.45–0.60 | 1640–2220 |
| 41 | 240 | 11 | 0.65 | 2700 |

EXAMPLE 42

A sample of resin prepared in Example 40 (100 grams) was dissolved in 100 grams of styrene to give a 50% weight percent mixture. This mixture was stirred with 1.0% by weight of benzoyl peroxide and cast into test bars which were cured 16 hours at 80°C. and then 45 minutes at 140°C. Subsequently, the samples were tested yielding a tensile strength of 4500–7000 psi. and an elongation of 3–4% (ASTM D 638-68), a tensile modulus of $1.4 \times 10^5$ psi. (ASTM D 638-68) and an izod impact resistance of 0.8 ft. lbs./inch width (ASTM D 256-56).

EXAMPLES 43–46

Example 14 was repeated replacing the acetic acid with 186 ml. of methacrylic acid and 0.5 gram (0.26% by weight of the methacrylic acid) of MEHQ. The resulting resins were analyzed by nuclear magnetic resonance and had the following repeating unit:

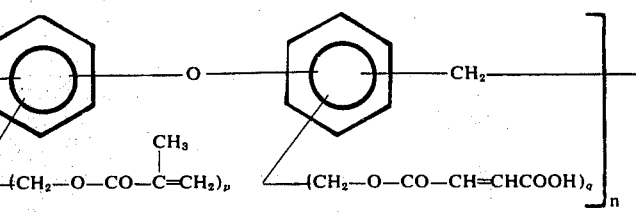

The results are tabulated in Table IX.

TABLE IX

| Ex. | Reflux Time in Min. | n | p | q | Mol. Wt. (Wt. Avg.) |
|---|---|---|---|---|---|
| 43 | 0 | 2.5 | 0.20 | 0.10 | 515 |
| 44 | 10 | 6.5 | 0.20 | 0.15 | 1370 |
| 45 | 15 | 7 | 0.40 | 0.35 | 1500 |
| 46 | 20 | 9 | 0.40 | 0.75 | 2870 |

TABLE IX-continued

| Ex. | Reflux Time in Min. | n | p | q | Mol. Wt. (Wt. Avg.) |
|---|---|---|---|---|---|
| Control | >20 | gelled | | | |

EXAMPLES 47–52

Example 45 was repeated but varying the ratios of formaldehyde to diphenyl ether. Example 44 is included for comparison. The results are tabulated in Table X.

TABLE X

| Ex. | Moles F* per Mole DPO | Reflux Time in Min. | n | p | q | Mol. Wt. (Wt. Avg.) |
|---|---|---|---|---|---|---|
| 47 | 6/1 | 10 | 2.5 | 0.45 | 0.15 | 640 |
| 48 | 6/1 | 35 | 6 | 0.75 | 0.25 | 1675 |
| 49 | 4/1 | 10 | 3 | 0.55 | 0.15 | 785 |
| 50 | 4/1 | 30 | 6.5 | 0.40 | 0.10 | 1500 |
| 44 | 2/1 | 10 | 6.5 | 0.20 | 0.15 | 1370 |
| 51 | 1.1/1 | 10 | 5 | 0.15 | 0.10 | 990 |
| 52 | 1.1/1 | 35 | 9 | 0.10 | 0.20 | 1950 |

*F = Paraformaldehyde

This shows the capability of controlling the values of $p$ and $q$ via variation of the ratio of formaldehyde to diphenyl ether.

This works only with those resins using both maleic anhydride and methacrylic. Systems using only one acid do not show this effect.

EXAMPLES 53–60

Example 44 was repeated varying the ratio of maleic anhydride and that of methacrylic acid to diphenyl ether. These results are given in Table XI. Example 44 is included for comparison.

TABLE XI

| Example | Moles of MA* per mole of DPO | Moles of MAA** per mole of DPO | Reflux Time in Min. | n | p | q | Mol. Wt. (Wt. Avg.) |
|---|---|---|---|---|---|---|---|
| 53 | 0.125/1 | 4.4/1 | 10 | 2.0 | 0.25 | 0.05 | 415 |
| 54 | 0.125/1 | 4.4/1 | 75 | 7 | 0.25 | 0.15 | 1580 |
| 55 | 0.25/1 | 4.4/1 | 10 | 2.5 | 0.25 | 0.10 | 520 |
|    | 0.25/1 | 4.4/1 | 40 | 7 | 0.30 | 0.15 | 1570 |
| 44 | 0.5/1 | 4.4/1 | 10 | 6.5 | 0.20 | 0.15 | 1370 |
| 56 | 0.75/1 | 4.4/1 | 10 | 7 | 0.15 | 0.10 | 1525 |
| 57 | 1/1 | 4.4/1 | 7 | 7 | 0.25 | 0.05 | 1480 |
| 58 | 0.5/1 | 1.1/1 | 5 | 8 | 0.25 | 0.05 | 1750 |
| 59 | 0.5/1 | 8.8/1 | 10 | 1.5 | 0.25 | 0.05 | 265 |
| 60 | 0.5/1 | 8.8/1 | 60 | 8 | 0.35 | 0.15 | 1930 |

*MA = Maleic Anhydride
**MAA = Methacrylic Acid

These examples indicate that $p$ and $q$ are not greatly affected by the levels of maleic anhydride and methacrylic acid while $n$ and the reaction time to reach a specific $n$ is greatly affected by these levels.

EXAMPLES 61–64

Example 42 was repeated using the resins of Examples 48, 50, 45 and 52 to make test bars. The results are tabulated in Table XII.

TABLE XII

| Example | Resins from Ex. | Flexural Strength (psi.) (ASTM D 790-66) | Flexural Modulus (psi.) (ASTM D 790-66) | Izod Impact Resistance (ASTM D 256-56) (ft. lbs./in.) |
|---|---|---|---|---|
| 61 | 48 | 12,000–13,000 | $5-6 \times 10^5$ | 0.9–1.0 |
| 62 | 50 | 12,000 | $5-7 \times 10^5$ | 1.0–1.1 |
| 63 | 45 | 12,000 | $6 \times 10^5$ | 1.0 |
| 64 | 52 | 1,000 | $5 \times 10^4$ | 0.6 |

EXAMPLES 65–68

The procedure of Example 1 was repeated substituting 89.0 grams (0.5 mole) of dibenzofuran, 102.3 grams (0.5 mole) of monochlorodiphenyl ether, 113 grams (0.5 mole) of t-butyl diphenyl ether, and 92.6 grams (0.5 mole) of diphenyl sulfide, respectively, for the diphenyl ether of Example 1. All gave products comparable to that in Example 1. The only differences were that the time of the reaction to obtain a product similar to Example 1 were twice as long with dibenzofuran and diphenyl sulfide and four times as long with chlorodiphenyl ether. The t-butyl diphenyl ether was comparable in reactivity to diphenyl ether.

I claim:

1. A formaldehyde copolymer resin having dependent unsaturated groups with the repeating unit:

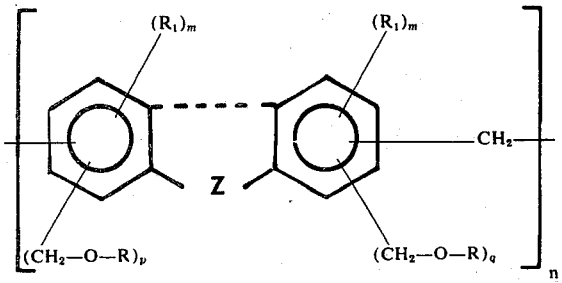

wherein R is an aliphatic acyl group derived from saturated acids having 2–6 carbons, olefinically unsaturated acids having 3–20 carbons, or an omega-carboxyaliphatic acyl group derived from olefinically unsaturated dicarboxylic acids having 4-12 carbons or mixtures thereof, $R_1$ is independently hydrogen, an alkyl group of 1-10 carbon atoms, or halogen, Z is selected from oxygen, sulfur, the group represented by Z taken with the dotted line represents dibenzofuran and dibenzothiophene moieties, or mixtures thereof, $n$ is a whole number sufficient to give a weight average molecular weight greater than about 500, $m$ is 0-2, $p$ and $q$ have an average value of 0 to 1 with the proviso that the total number of $p$ and $q$ groups are sufficient to give greater than one unsaturated group per resin molecule.

2. A formaldehyde copolymer resin having dependent unsaturated groups with the repeating unit:

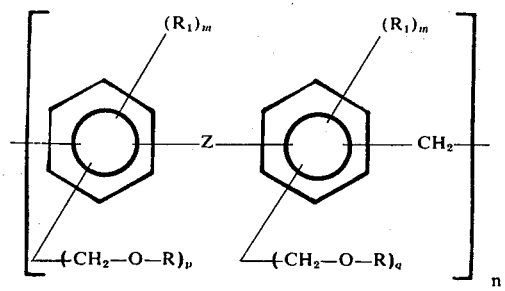

wherein R is an aliphatic acyl group derived from saturated acids of 2-6 carbons, olefinically unsaturated acids having 3-20 carbons or an omega-carboxy aliphatic acyl group derived from olefinically unsaturated dicarboxylic acids having 4-12 carbons or mixtures thereof, $R_1$ is independently hydrogen, an alkyl group of 1-10 carbon atoms, or halogen, Z is selected from oxygen or sulfur, $n$ is a whole number sufficient to give a weight average molecular weight greater than about 500, $m$ is 0-2, $p$ and $q$ have an average value of 0-1 with the proviso that the total number of $p$ and $q$ groups are sufficient to give greater than one unsaturated group per resin molecule.

3. A formaldehyde copolymer resin having dependent unsaturated groups with the repeating unit:

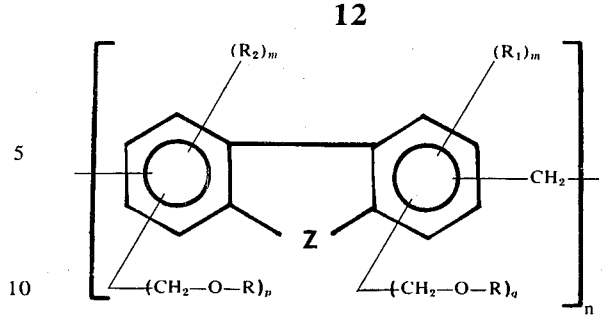

wherein R is an aliphatic acyl group derived from saturated acids of 2-6 carbons, olefinically unsaturated acids having 3-20 carbons, or an omega-carboxy aliphatic acyl group derived from olefinically unsaturated dicarboxylic acids having 4-12 carbons, or mixtures thereof, $R_1$ is independently hydrogen, an alkyl group of 1-10 carbon atoms, or halogen, Z is selected from oxygen or sulfur, $n$ is a whole number sufficient to give a weight average molecular weight greater than about 500, $m$ is 0-2, $p$ and $q$ have an average value of 0-1 with the proviso that the total number of $p$ and $q$ groups are sufficient to give greater than one unsaturated group per resin molecule.

4. A disubstituted formaldehyde copolymer resin as set forth in claim 1 wherein the $p$ group is derived from saturated acids and the $q$ group is derived from an olefinically unsaturated dicarboxylic acid.

5. A monosubstituted formaldehyde copolymer resin as set forth in claim 1 wherein the $p$ group is derived from an olefinically unsaturated acid.

6. A disubstituted formaldehyde copolymer resin as set forth in claim 1 wherein the $p$ group is derived from an olefinically unsaturated acid and the $q$ group is derived from an olefinically unsaturated dicarboxylic acid.

7. A curable composition comprising the resin of claim 1 admixed with reactive diluents selected from vinyl aromatic monomers, alkyl esters of olefinically unsaturated carboxylic acids, vinyl esters of carboxylic acids, or mixtures thereof.

8. The cured composition of claim 7.

* * * * *